United States Patent Office 3,328,793
Patented June 27, 1967

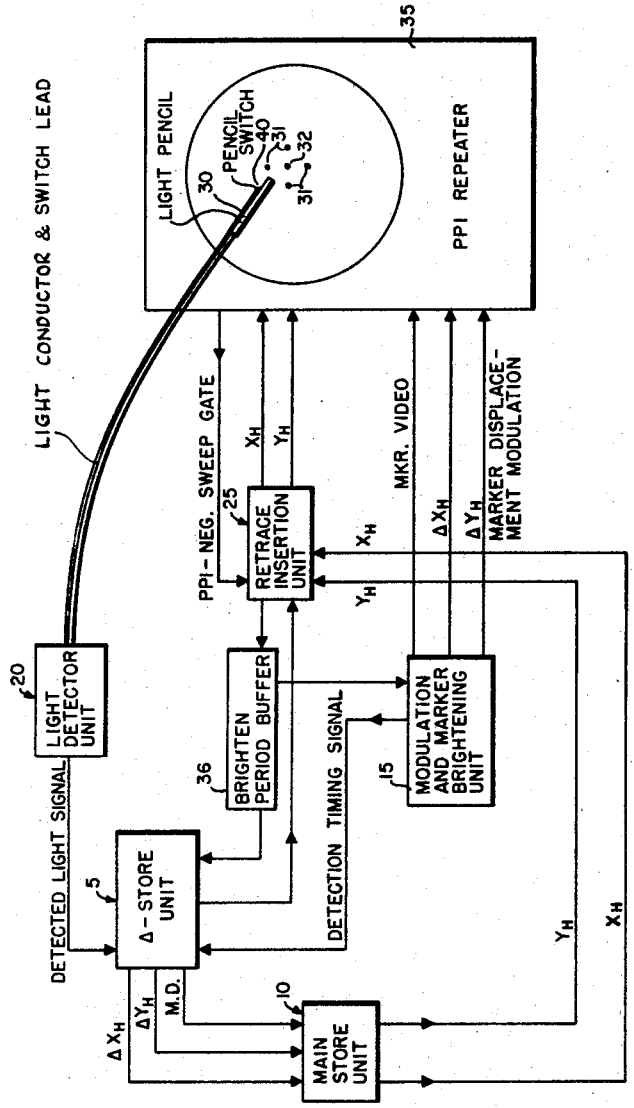

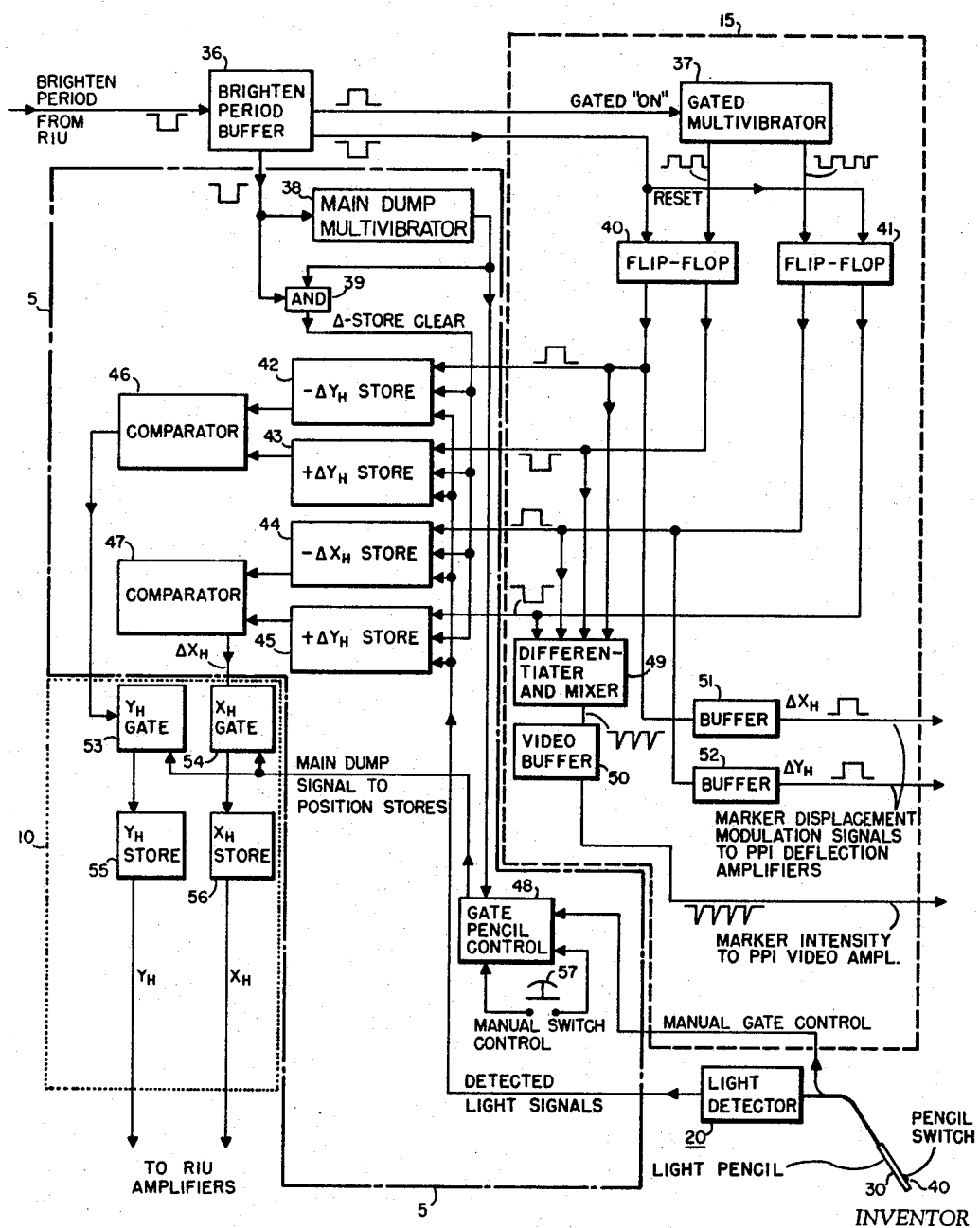

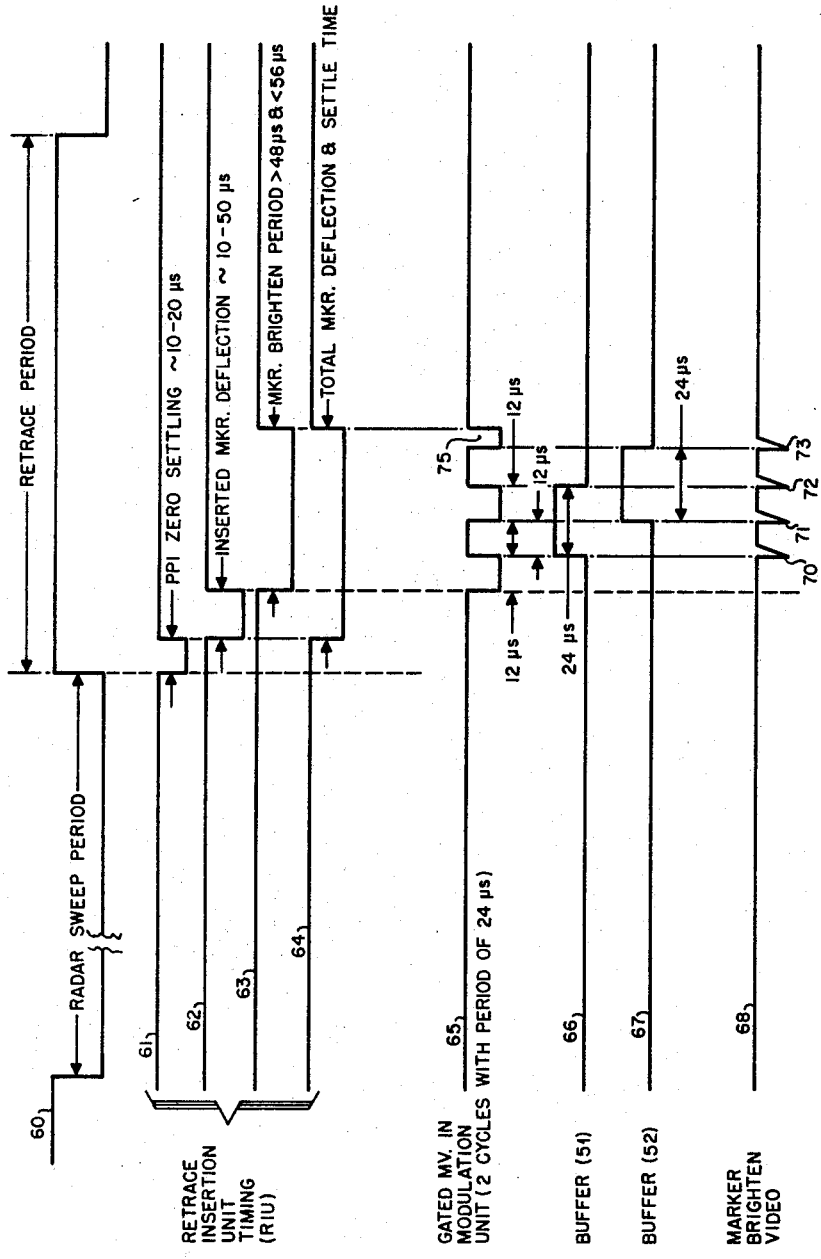

3,328,793
POSITION-TO-VOLTAGE TRANSLATOR
Donald J. McLaughlin, Washington, D.C., and Frederick R. Fluhr, Oxon Hill, Md., assignors to the United States of America as represented by the Secretary of the Navy
Filed Feb. 4, 1966, Ser. No. 525,811
4 Claims. (Cl. 343—5)

ABSTRACT OF THE DISCLOSURE

A system for rapidly and accurately extracting position data from a two dimensional information display such as a radar PPI cathode ray tube. Four rectangularly located light pips are sequentially placed on the display during the retrace period of the PPI without interfering with the radar signal returns. When a light detecting pencil is pointed toward a radar information signal the misalignment of the four light pips with respect to this information is detected and the pips are automatically moved so as to circumscribe the radar signal.

The present invention relates to an improved device for extracting coordinate position data from a cathode ray tube or the like using a light pencil (photodetector) as the sensing element, the invention acting to convert positional information to voltage.

In the field of data-processing, a number of operations require the rapid and accurate extraction, control and coordination of position data from, for example, cathode ray tube information sources used in connection with radar and IFF Plan Position Indicator or computer generated displays. Various data extracting and controlling devices have been used including range and bearing "cranks," "joystick" controls, "bowling ball" controls, "light gun" controls and "electronic pencil" controls. All of these devices produce desired positional information in the form of either analog or digital information. This data is then used to perform command or control functions in an associated data-processing system.

However, in all of these systems a problem of maximum time utilization is present which can give rise to costly time delays in information retrieval of IFF systems presently used in surveying enemy missles. For example, in a track-while-scan indicator in a radar system using any suitable sensor as a cathode ray coordinate position detector, there will be a "dead" period (retrace period) following each radar sweep period. Depending on the operational needs of each system this "dead" period can be of critical importance since it allows additional time in which various non-detecting or non-tracking operations may be performed. Obviously, any such reductions in time enhance the operational characteristics of the particular retrieval system used.

This system accordingly provides a position-to-voltage indicator wherein the retrace time period, or other such "dead" periods depending on the system used, is time shared with various other components in the system in conjunction with a light pencil indicator, thus providing rapid and accurate extraction, control and coordination of position data from a cathode ray tube or the like. To attain this, a retrace insertion unit (RIU) is connected to the negative sweep gate of the fixed deflection coil of a Plan Position Indicator (PPI), the output of the RIU being connected to a modulation and a marker brightening unit (MMBU) through a delta-store unit, the output of the delta-store unit being connected to a main store unit whose output connects to an input of the delta-store such that when the light pencil is pointed towards the information received on the screen of the PPI a signal will be sent to the store units causing a hook marker to be formed on the screen of the PPI so as to circumscribe the radar signal, the signals also activating the modulation and marker brightening unit during the retrace period of a radar scanning cycle whereby the coordinate information may be transferred from the PPI screen to a readout device.

It is the principal object of the present invention to provide a position-to-voltage converter for rapidly and accurately extracting coordinate position data.

Another object of the present invention is the provision of a position-to-voltage converter using time sharing techniques to maximize retrieval information during a given time interval.

A further object of this invention is the provision of a position-to-voltage converter using novel computerized circuitry which provides optimum time utilization in information retrieval systems.

Still another object of this invention is the provision of a position-to-voltage converter using novel computerized circuitry in conjunction with time shared components and a light pencil indicator so as to provide optimum utilization of non-retrieval time for non-detecting uses.

Yet another object of this invention is the provision of a position-to-voltage converter using novel computerized circuitry in conjunction with time sharing components and a light pencil indicator so as to optimize non-retrieval time for non-detecting uses wherein stable synchronization is obtained.

Other objects and many of the attendant advantages of this invention will be readily appreciated as the same becomes better understood by reference to the following detailed description when considered in connection with the accompanying drawings wherein:

FIG. 1 shows, in block diagram, a schematic of the system;

FIG. 2 shows a more detailed circuit diagram of FIG. 1; and

FIG. 3 shows the timing diagram illustrating the time sharing feature of the particular system illustrated.

In FIG. 1 there is shown a cathode ray scope 35 into which is fed the information 32 received from, for example, a conventional radar tracking system. The scope illustrated also contains a conventional fixed deflection coil PPI (radar Plan Position Indicator) repeater having its negative sweep gate connected to the retrace insertion unit (RIU) 25 which enables the RIU to take over control of the PPI deflection system during the indicator retrace time. The RIU is further connected via buffer unit 36 to the delta-store unit 5 where timing signals received from the RIU are utilized to derive coordinate position signals 31 which are applied to main store unit 10 from where these signals are then appled to the RIU. Light pencil 30, operating in conventional fashion, detects the coordinate information 32 from scope 35 and transfers the information through a light detector unit 20 to the delta-store unit 5. Delta-store unit 5 is connected to main store unit 10 so as to provide routes therebetween for the $\Delta X_H$ and $\Delta Y_H$ signals. These signals representing the degree of misalignment between the light pencil and the displayed marker and are summed algebraically with the existing stored $X_H$ and $Y_H$ signal in order to derive the new $X_H$ and $Y_H$ coordinate position. A main dump multivibrator (more fully explained in FIG. 2) in unit 5 is connected through lead M. D. to main store unit 10, the latter of which has two output paths $X_H$ and $Y_H$ connecting to the coordinate position inputs of the RIU 25 which provides a deflection signal to the PPI deflection coils during the retrace period. RIU 25 is further connected to scope 35 providing an input path for the $X_H$ and $Y_H$ signals. A modulation and marker brightening unit 15 (MMBU) connected to delta-store unit 5 provides scope 35 with sufficient deflection modulation and intensification so that the hook marker pattern 31, which is in the form of four dots defining a square with the radar signal in the middle, can be displayed on the scope 35 in order that the light detector can detect this displayed hook marker upon pressing the switch 40. The details of the timing periods of the various components as labeled have been omitted in the discussion of FIG. 1 and are more fully discussed hereinafter in connection with FIG. 3.

FIG. 2, which is a more detailed circuit diagram of the invention, shows the RIU brighten period pulse being fed to a brighten period buffer 36 which derives a positive and a negative square wave pulse therefrom. The positive pulse is fed so as to trigger the gated multivibrator 37. The negative pulse is fed in parallel paths to release the displacement modulation flip-flops 40 and 41 at proper intervals. The buffered brighten period signal from buffer 36 also serves to trigger the main dump multivibrator 38 and remove the inhibit on the AND unit 39 so as to allow the delta-store values to be held until after the dump pulse period ends.

The positive pulse from buffer unit 36 acts to gate multivibrator 37 "on," for a period of two complete timing cycles of multivibrator 37, during which period multivibrator 37 produces a pair of double-pulsed square wave signals of opposing polarity to drive flip-flops 40 and 41, each producing one cycle of a square wave. Because each flip-flop triggers on out-of-phase signals from the multivibrator, and accordingly divides the input by two, the outputs of the flip-flops will be in phase quadrature. These flip-flop outputs, which ultimately drive the PPI deflection amplifier through buffers 51 and 52, provide the hook marker 31 in a square pattern at the $X_H$, $Y_H$ position 32 during the retrace period. The outputs of flip-flops 40 and 41 also gate the delta-stores 42, 43, 44 and 45 in a predetermined sequence such that if the light detector is producing an output, it will be placed in the proper delta-store. So as to make the hook marker more visible on the screen of scope 35 (FIG. 1) the outputs of flip-flops 40 and 41 are differentiated and mixed by unit 49 subsequently passed through a video buffer 50 where the resulting pulses act to intensify the hook markers at the corners of the displacement square being traced at the $X_H$, $Y_H$ position.

The outputs of the delta-store units 42–45 are compared by comparator units 46 and 47 and any imbalance will be passed on through the position gates 53 and 54 and held in the $X_H$ and $Y_H$ stores 55, 56, where the output is sent to the RIU amplifiers to be used during the marker display periods.

Light pencil 30 may be held in the operator's hand and is provided with a finger-operated switch 40 to enable a coordinate transfer action to take place when desired. As previously mentioned light pencil 30 is connected through a conventional light detecter 20 to each of the inputs of the delta store units 42, 43, 44 and 45 while finger-operated switch 40 is connected through gate pencil control 48, the latter being gated by the signal supplied by main dump multivibrator 38 to supply the signal sensed by light pencil 30 to gates 53 and 54. Manual switch 57 is operable to place unit 48 into and out of the main circuit.

Turning now to FIG. 3 where a typical timing diagram of the system used is shown, reference 60 represents a radar sweep period (detecting period) and a retrace period (dead period). Directly below the above reference period, numbers 61–64 represent the timing sequence provided by the RIU for various operations of the system. Timing period 65 includes a two-cycle period and an additional or "extra" period 75 which acts to insure the completion of the gating period. Periods 66 and 67 represent the timing of buffers 51 and 52. Period 68 illustrates the marker brighten timing, including timing of brighten pulses 70–73, relative to buffer signals shown in timing periods 66 and 67. The sequence and duration of each period is illustrated and relative orders of each are clearly shown so that no detailed discussion thereof is deemed necessary, and although specific time ranges in $\mu$'s are shown, they are intended to be merely illustrative rather than limiting. The function of each of the periods will become readily apparent in the discussion of the operation of the device in connection with FIGS. 1 and 2 discussed below. Reference to labels between block diagrams in FIG. 1 is suggested so as to facilitate understanding of the periods illustrated in FIG. 3.

*Operation*

During each PPI retrace interval, the cathode ray tube electron beam is deflected to the stored $X_H$, $Y_H$ hook coordinate by the RIU. A marker brightening period is provided by the RIU after the cathode ray tube electron beam has settled at the $X_H$, $Y_H$ position coordinate 32. The brightening period interval generated by the RIU initiates a displacement modulation signal and a set of intensity modulation signals. These signals cause four dots 31 of light to be "painted" on the cathode ray tube in a square pattern at $X_H$, $Y_H$ position and are intensified sequentially in a counter-clockwise sense in a manner discussed below. Then when pointed toward the marker, the light pencil detects these sequentially brightened dots, amplifies the detected signals and sends them on to the delta-store unit which routes the signals to the proper differential stores.

To paint the four dots on the screen, initially, when the $X_H+\Delta X$, $Y_H+\Delta Y$ dot is brightened by pulse 71 in FIG. 3 the $+\Delta X$ and $+Y$ store gates are opened and when the operator engages the light pencil detector circuit by pressing finger-button 40, the detected $+\Delta X$ and $+\Delta Y$ signal will be stored. From, for example 5 to 15 microseconds later (still in the same retrace period), the $X_H-\Delta X$, $Y_H+\Delta Y$ dot, brightened by pulse 71 in FIG. 3, will be painted and the corresponding store gates will be opened. The $X_H+\Delta X$, $Y_H-\Delta Y$ and $X_H-\Delta X$, $Y_H-\Delta Y$ dots are brightened by pulses 72, and 73, respectively, and are subsequently painted on the screen in similar manner. Thus all four dots are painted in the retrace brighten period.

At the end of the retrace brighten period, the $+\Delta X$ store is compared to the $-\Delta X$ store and the $+\Delta Y$ store is compared to the $-\Delta Y$ store. If there is a difference in the $\Delta X$ stores, the difference is transferred to the $X_H$ position store. A similar action occurs simultaneously on the $Y_H$ store if the $\Delta Y$ stores differ in value. Thus, if the operator picks up the displacement modulated hook with the light pencil, the hook can be made to follow the motion of the pencil by transferring the error differentials to the hook stores $X_H$ and $Y_H$ during each retrace period.

While a radar PPI is shown on the 2-dimensional display, it should be understood that any 2-dimensional display of similar light signals could be used. For example, the cathode ray display could be replaced by any light projection system (e.g. laser on a display screen) which can be rapidly modulated in 2-dimensional space and intensity. Obviously minor modifications in the other circuitry will be desirable to accommodate the modified device.

Further, while FIG. 3 shows a particular timing arrangement used in the system as described, such values may be modified for other PPI repeaters or computer displays.

It should be understood, of course, that the foregoing disclosure relates to only a preferred embodiment of the invention and that numerous modifications or alterations may be made therein without departing from the spirit and the scope of the invention or set forth in the appended claims.

What is claimed and desired to be secured by Letters Patent of the United States is:

1. In combination:
  a radar system including a plan position indicator display screen and a sweep circuit for producing thereon a visual target signal representative of detected intelligence, said sweep circuit having energization potential passing therethrough to define a radar sweep period and a retrace period;

marker circuit means for applying rectangular coordinate signals to said radar system during said retrace period so as to produce on the display screen thereof four visual marker signals circumscribing a definitive area of said display screen, said marker circuit means including a modulation and marker brightening unit for providing sufficient deflection modulation and intensification so that said circumscribing marker signals may be readily detected by a light detector unit;

a movable light detector adapted to be placed over said visual target signal and produce an output voltage representative of the degree of alignment of said detector with respect to the positions of said four visual marker signals;

misalignment compensating circuit means including a differential store and main store means for releasing signals received therein at predetermined intervals, said misalignment compensating circuit means being responsive to said energization potential and said output voltage to derive therefrom rectangular coordinate signals correlative to the degree of misalignment of said light detector relative to said four visual marker signals; and a retrace insertion unit operatively associated with said differential and main store means for providing a set of displacement signals to said differential store means of predetermined intervals in a sequential pattern so as to cause said four visual marker signals to be displayed on said screen; whereby an operator is guided in moving said light detector to position said circumscribed area so that said visual target signal is located centrally thereof.

2. The device defined as claim 1 wherein, said marker brightening unit includes:

a gated multivibrator having two outputs, a pair of flip-flops each connected at its input to a respective one of said gated multivibrator outputs, said flip-flops being triggered by the signal from said retrace insertion unit, said flip-flops each having a pair of outputs, a differentiator and mixer unit, each of said flip-flop outputs being connected to the input of said differentiator and mixer, a video buffer connected to the output of said differentiator and mixer, the output of said video buffer connected to the video amplifier of said plan position indicator display screen, and a pair of buffer units each connected at its input to one output of a respective flip-flop, the outputs of said buffers being connected to the deflection amplifiers of said plan position indicator display screen.

3. The device as defined in claim 1, wherein said differential store means includes:

a main dump multivibrator connected at its input to said retrace insertion unit, four store units connected to said modulation and marker brightening unit connected at their respective inputs to the output of said modulation and marker brightening unit so as to receive the coordinate position signals, a pair of comparators each connected at their respective inputs to the coordinate store units corresponding to the X-position and Y-position coordinate, respectively, the output of said comparators connected to said main store unit.

4. The device as defined in claim 1 further including:

a brighten period buffer connected between said retrace insertion unit and said differential store means and said marker brightening unit, and wherein;

the marker brightening unit includes a gated multivibrator having two outputs, a pair of flip-flops each connected at its input to a respective one of said gated multivibrator outputs, said flip-flops being triggered by the signal from said retrace insertion unit, said flip-flops each having a pair of outputs, a differentiator and mixer unit, each of said flip-flop outputs being connected to the input of said differentiator and mixer, a video buffer connected to the output of said differentiator and mixer, the output of said video buffer connected to the video amplifier of said plan position indicator display screen, a pair of buffer units each connected at its input to one output of a respective flip-flop, the outputs of said buffers being connected to the deflection amplifiers of said plan position indicator display screen, a main dump multivibrator connected at its input to said retrace insertion unit, four store units connected to said modulation and marker brightening unit connected at their respective inputs to the output of said modulation and marker brightening unit so as to receive the coordinate position signals, a pair of comparators each connected at their respective inputs to the coordinate store units corresponding to the X-position and Y-position coordinate, respectively, the output of said comparator connected to said main store unit, a respective gate connected to each of said respective comparators, a gate pencil control associated with said light detector and said main dump multivibrator, the output of said gate pencil control connected to each of said gates, a pair of store units connected at each of their inputs to a respective said gate unit, the output of said store units connected to the retrace insertion unit.

References Cited
UNITED STATES PATENTS
2,849,707  8/1958  White _____ 343—5

C. L. WHITHAM, *Assistant Examiner.*

RODNEY D. BENNETT, *Primary Examiner.*